(12) United States Patent
Leppänen et al.

(10) Patent No.: US 12,321,661 B2
(45) Date of Patent: Jun. 3, 2025

(54) USER INTERFACE, METHOD, COMPUTER PROGRAM FOR ENABLING USER-SELECTION OF AUDIO CONTENT

(71) Applicant: Nokia Technologies Oy, Espoo (FI)

(72) Inventors: Jussi Leppänen, Tampere (FI); Antti Eronen, Tampere (FI); Arto Lehtiniemi, Lempäälä (FI); Miikka Vilermo, Siuro (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 434 days.

(21) Appl. No.: 17/634,279

(22) PCT Filed: Aug. 26, 2020

(86) PCT No.: PCT/EP2020/073824
§ 371 (c)(1),
(2) Date: Feb. 10, 2022

(87) PCT Pub. No.: WO2021/047909
PCT Pub. Date: Mar. 18, 2021

(65) Prior Publication Data
US 2022/0326904 A1    Oct. 13, 2022

(30) Foreign Application Priority Data
Sep. 9, 2019    (EP) .................................. 19196229

(51) Int. Cl.
G06F 3/0482    (2013.01)
G06F 3/16    (2006.01)

(52) U.S. Cl.
CPC ............ G06F 3/165 (2013.01); G06F 3/0482 (2013.01)

(58) Field of Classification Search
CPC .............................. G06F 3/165; G06F 3/0482
See application file for complete search history.

(56) References Cited

U.S. PATENT DOCUMENTS 7,768,544 B2    8/2010    Cutler
9,824,723 B1    11/2017    Bentley et al.
(Continued)

FOREIGN PATENT DOCUMENTS

EP    3236363 A1    10/2017
EP    3499917 A1    6/2019
(Continued)

OTHER PUBLICATIONS

Office action received for corresponding Indian Patent Application No. 202247020291, dated Aug. 30, 2022, 7 pages.
(Continued)

*Primary Examiner* — Haoshian Shih
(74) *Attorney, Agent, or Firm* — ALSTON & BIRD LLP

(57) ABSTRACT

An apparatus comprising means for: providing a user interface for enabling a user to select audio content, comprising an arrangement of multiple user-selectable visual elements at positions in the user interface that are indicative of different orientations from a user and have an appearance dependent upon audio content for the respective orientations; and responding to selection of a user-selectable visual element at a position in the user interface indicative of an orientation from the user to select, for processing, audio content for the orientation.

16 Claims, 6 Drawing Sheets

(56) References Cited

U.S. PATENT DOCUMENTS

| | | | |
|---|---|---|---|
| 10,015,527 B1 | 7/2018 | Banta et al. | |
| 11,983,401 B1* | 5/2024 | Ku | G06T 19/006 |
| 2011/0119627 A1* | 5/2011 | Cho | G06F 3/04817 |
| | | | 715/848 |
| 2016/0080650 A1 | 3/2016 | Okazava et al. | |
| 2016/0292884 A1 | 10/2016 | Schnittman et al. | |
| 2017/0329392 A1* | 11/2017 | Keskin | G06F 3/015 |
| 2018/0176547 A1* | 6/2018 | Kobayashi | H04N 13/344 |

FOREIGN PATENT DOCUMENTS

| | | |
|---|---|---|
| EP | 3506082 A1 | 7/2019 |
| EP | 3742185 A1 | 11/2020 |
| WO | 2009/136227 A1 | 11/2009 |
| WO | 2014/181529 A1 | 11/2014 |
| WO | 2019/067620 A1 | 4/2019 |

OTHER PUBLICATIONS

Langlotz et al., "Audio Stickies: Visually-guided Spatial Audio Annotations on a Mobile Augmented Reality Platform", Ozchi, 2013, pp. 1-10.

Extended European Search Report received for corresponding European Patent Application No. 19196229.9, dated Mar. 20, 2020, 7 pages.

International Search Report and Written Opinion received for corresponding Patent Cooperation Treaty Application No. PCT/EP2020/073824, dated Sep. 25, 2020, 10 pages.

Office action received for corresponding European Patent Application No. 19196229.9, dated Jun. 26, 2023, 4 pages.

Intention to Grant for European Application No. 19196229.9 dated Mar. 17, 2025, 50 pages.

\* cited by examiner

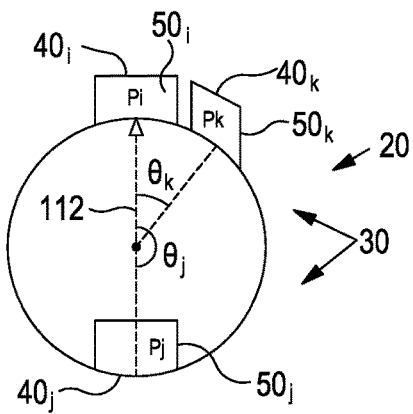
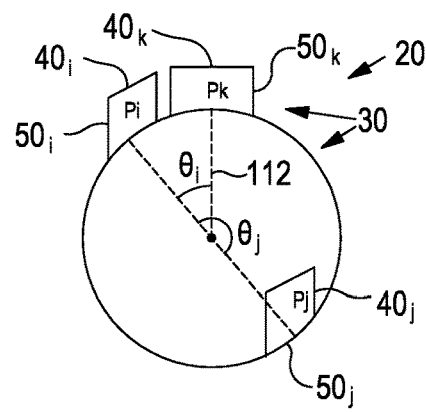
FIG. 1A                    FIG. 1B
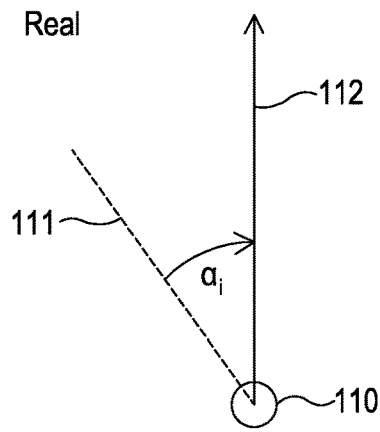
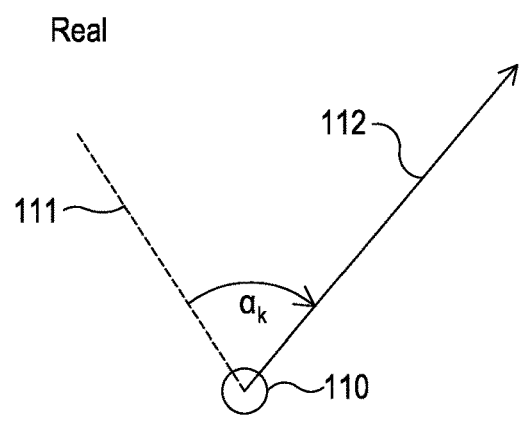
FIG. 2A                    FIG. 2B
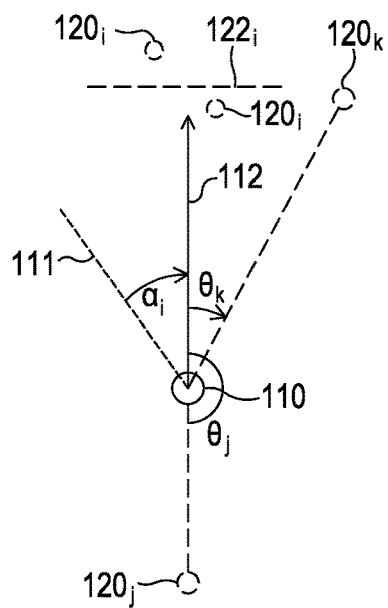
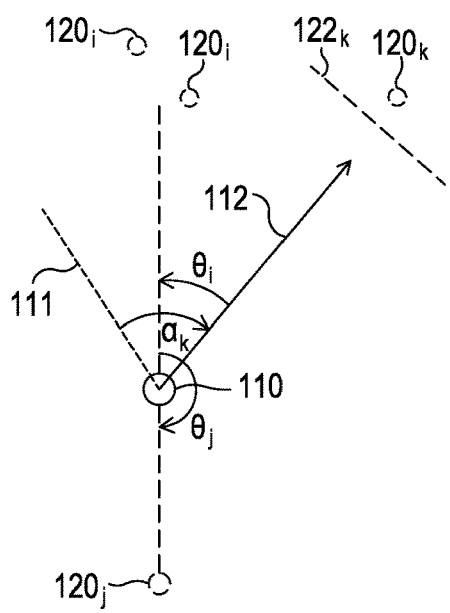
FIG. 3A                    FIG. 3B

USER INTERFACE, METHOD, COMPUTER PROGRAM FOR ENABLING USER-SELECTION OF AUDIO CONTENT

RELATED APPLICATION

This application claims priority to PCT Application No. PCT/EP2020/073824, filed on Aug. 26, 2020, which claims priority to EP Application Serial No. 19196229.9, filed on Sep. 9, 2019, each of which is incorporated herein by reference in its entirety.

TECHNOLOGICAL FIELD

Embodiments of the present disclosure relate to a user interface, method, computer program for enabling user-selection of audio content.

BACKGROUND

There exist apparatuses that have a user interface for enabling a user to select audio content and that respond to selection of audio content by rendering the audio content or otherwise processing the audio content.

However, these user interfaces have various limitations, particularly where different audio content is associated with different orientations relative to a user.

BRIEF SUMMARY

According to various, but not necessarily all, embodiments there is provided an apparatus comprising means for:
  providing a user interface, for enabling a user to select audio content, wherein the user interface comprises an arrangement of multiple user-selectable visual elements, at positions in the user interface that are indicative of different orientations from a user, wherein the user-selectable visual elements have an appearance dependent upon audio content for the respective orientations; and
  responding to selection of a user-selectable visual element at a position in the user interface indicative of an orientation from the user to select, for processing, audio content for the orientation.

In at least some but not necessarily all examples, at least one of the multiple user-selectable visual elements, at a position indicative of an orientation from a user, is configured to have an appearance that comprises a visual extract of visual content for the orientation that is dependent upon audio content for the orientation.

In at least some but not necessarily all examples the visual extract of visual content for the orientation comprises an image for the orientation, a looped clip of video for the orientation, or a repeated sequence of images for the orientation.

In at least some but not necessarily all examples the visual content for an orientation is visual content that would be rendered to a user using mediated reality when a user changes a real world point of view of the user so the real world point of view of the user corresponds to the orientation, wherein mediated reality comprises rendering content in dependence upon a real world point of view of a user.

In at least some but not necessarily all examples, if audio content for an orientation is changed without changing the orientation, there is a change in appearance of the user-selectable visual element at the position in the user interface indicative of the orientation.

In at least some but not necessarily all examples audio content for an orientation is audio content that would be rendered to a user using mediated reality when a user changes a real world point of view of the user so that the real world point of view of the user corresponds to the orientation, wherein mediated reality comprises rendering content in dependence upon a real world point of view of a user.

In at least some but not necessarily all examples, the apparatus comprises a head-mounted apparatus for rendering the user interface.

In at least some but not necessarily all examples, a first user-selectable visual element of the arrangement has a first position in the user interface indicative of a first orientation from the user and has a first appearance dependent upon first audio content for the first orientation,
  wherein a second user-selectable visual element of the arrangement has a second position in the user interface indicative of a second orientation from the user and has a second appearance dependent upon second audio content for the second orientation,
  wherein the apparatus is configured to: respond to actuation of the first user-selectable visual element to select the first audio content but not the second audio content, and to respond to user selection of the second user-selectable visual element to select the second audio content but not the first audio content.

In at least some but not necessarily all examples, one or more characteristics of an appearance of a user-selectable visual element is indicative of one or more characteristics of audio content selectable via the user-selectable visual element.

In at least some but not necessarily all examples, the user-selectable visual elements of the arrangement comprises a first portion that is asymmetric and indicative of an orientation from a user and a second portion that has an appearance dependent upon audio content for the orientation.

In at least some but not necessarily all examples, the first portion represents a segment of a circle having characteristics of appearance including one or more of segment size, width and length.

In at least some but not necessarily all examples, the second portion has characteristics of appearance including one or more of:
  size, brightness, coloration, blurred edges, image content.

In at least some but not necessarily all examples, the apparatus comprises means for:
  responding to selection of a user-selectable visual element at a position in the user interface indicative of an orientation from the user to adapt the arrangement of multiple user-selectable visual elements to include more user-selectable visual elements, at positions in the user interface that are indicative of orientations from a user and have an appearance dependent upon audio content for the respective orientations; and
  responding to selection of a user-selectable visual element at a position in the user interface 20 indicative of an orientation from the user to select audio content for the orientation.

According to various, but not necessarily all, embodiments there is provided a computer program that, when run on a computer, performs:
  providing a user interface, for enabling a user to select audio content, comprising an arrangement of multiple user-selectable visual elements, at positions in the user interface that are indicative of different orientations from a user, that have an appearance dependent upon audio content for the respective orientations; and responding to selection of a user-selectable visual element at a position in the user interface indicative of an orientation from the user to select, for processing, audio content for the orientation.

According to various, but not necessarily all, embodiments there is provided a method comprising:

providing a user interface, for enabling a user to select audio content, comprising an arrangement of multiple user-selectable visual elements, at positions in the user interface that are indicative of different orientations from a user, wherein each user-selectable visual element has an appearance dependent upon audio content for a respective orientation; and responding to selection of a user-selectable visual element at a position in the user interface indicative of an orientation from the user to select, for processing, audio content for the orientation.

According to various, but not necessarily all, embodiments there is provided examples as claimed in the appended claims.

The user interface is particularly useful when audio content is associated with to both a front and a rear of a user.

BRIEF DESCRIPTION

Some examples will now be described with reference to the accompanying drawings in which:

FIG. 1A & FIG. 1B show an example of the subject matter described herein;

FIG. 2A & FIG. 2B show an example of the subject matter described herein;

FIG. 3A & FIG. 3B show an example of the subject matter described herein;

FIG. 10A, 10B, 100 show examples of the subject matter described herein;

DETAILED DESCRIPTION

Figure 4A:
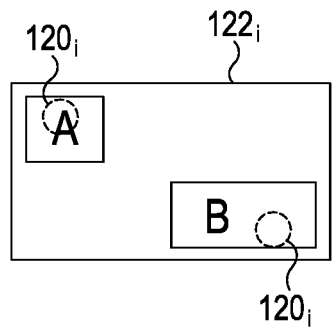
FIG. 4A & FIG. 4B show an example of the subject matter described herein.

In the following examples, audio content 120 is associated with different orientations θ relative to a user 110. For example, audio content 120 can be rendered from the orientation θ it is associated with.

Multiple user-selectable visual elements 40 are arranged, in an arrangement 30, at positions p in the user interface 20. The positions p in the user interface 20 are indicative of different orientations θ from the user 110. In some examples the position p is defined by a variable orientation θ from a point O and, optionally, a variable distance r from the point O.

The user-selectable visual elements 40 for orientations θ have an appearance 50 dependent upon audio content 120 associated with the respective orientations θ.

User selection of a user-selectable visual element 40 at a position p in the user interface 20 indicative of an orientation θ from the user 110 causes selection of the audio content 120 associated with that orientation θ for processing, FIGS. 1A and 1B illustrate examples of a user interface 20 for enabling a user to select audio content. The user interface 20 comprises an arrangement 30 of multiple user-selectable visual elements 40 at positions p in the user interface 20. The positions p in the user interface 20 are indicative of different orientations θ from a user 110 (not illustrated in the FIGS. 1A and 1B).

In this example, the user can be considered to have a position O in the user interface 20 and the angle θ is measured from O. In some examples the position p is defined by a variable orientation θ from a point O and, optionally, a variable distance r from the point O. In this illustrated example, the position p is defined by a variable orientation θ from a point θ and a fixed distance r from the point O.

In these figures, other figures and in the description, some reference numerals have suffixes and some do not. Suffixes are used to indicate different instances within a class of similar items. When a specific instance of an item is referred to, it will generally be referred to using the reference numeral with a suffix. When the general class of items is referred to it will generally be referred to without a suffix. Thus, the user interface 20 comprises an arrangement 30 of multiple user-selectable visual elements 40 at respective positions p in the user interface 20. The positions p in the user interface 20 are indicative of different orientations θ from a user 110. Or, alternatively, the user interface 20 comprises an arrangement 30 of multiple user-selectable visual elements $40_i$, $40_j$, $40_k$ at respective positions $p_i$, $p_j$, $p_k$ in the user interface 20. The positions $p_i$, $p_j$, $p_k$ in the user interface 20 are indicative of different orientations $\theta_i$, $\theta_j$, $\theta_k$ from a user 110.

In the examples illustrated, but not necessarily all examples, the angle of θ is defined relative to a current point of view 112 of the user. Therefore, as the point of view 112 of the user changes, the arrangement 30 of multiple user-selectable visual elements 40 changes. For example, if the point of view 112 rotates then the arrangement 30 of multiple user-selectable visual elements 40 rotates. This rotation is illustrated by comparing FIG. 1A and FIG. 1B. In these examples, the arrangement 30 of multiple user-selectable visual elements 40 is the same in both FIGS. 1A and 1B except that it has been rotated about an axis through the point O and orthogonal to the change in orientation.

The multiple user-selectable visual elements 40 at positions p have an appearance 50 dependent upon audio content 120 for the orientations θ associated with the positions p. Thus, the different multiple user-selectable visual elements $40_i$, $40_j$, $40_k$ at respective positions $p_i$, $p_j$, $p_k$ have respective visual appearances $50_i$, $50_j$, $50_k$ dependent upon audio content $120i$, $120j$, $120k$ for the orientations $\theta_i$, $\theta_j$, $\theta_k$ associated with the positions $p_i$, $p_j$, $p_k$.

Figures 12, 13, 14:
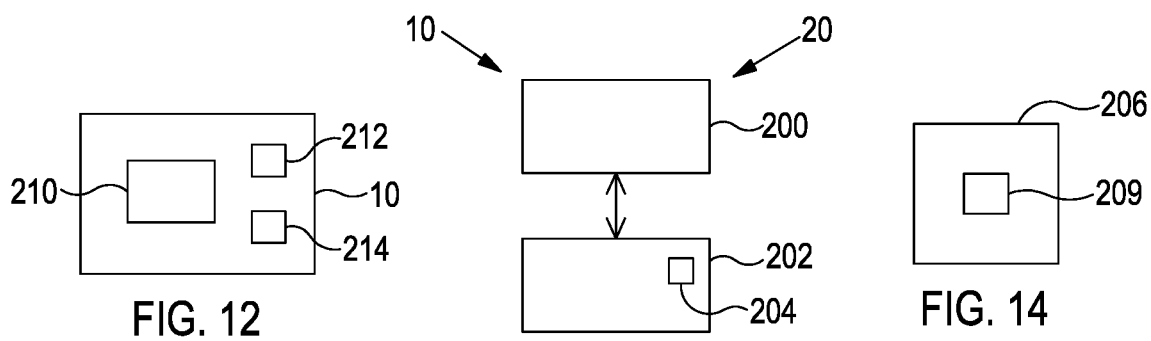
FIG. 12 shows another example of the subject matter described herein.
FIG. 13 shows another example of the subject matter described herein.
FIG. 14 shows another example of the subject matter described herein.
Figure 15:
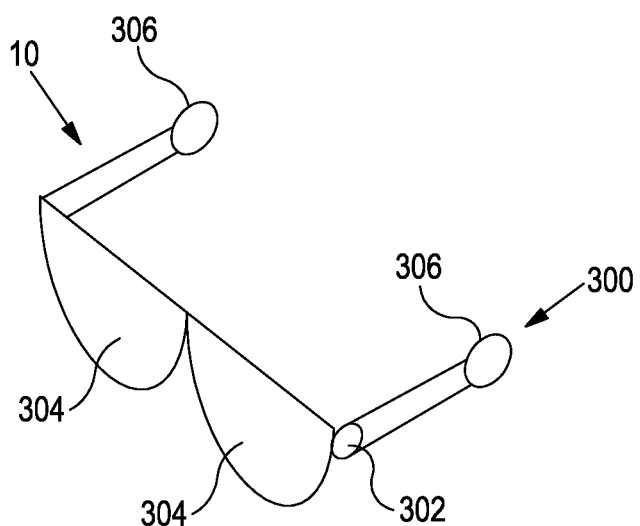
FIG. 15 shows another example of the subject matter described herein.

The user interface 20 is part of an apparatus 10, for example as illustrated in FIG. 12, 13 or 15. The user interface 20 and the apparatus 10 are configured to respond to selection of a user-selectable visual element 40. If the selected user-selectable visual element 40, is a user-selectable visual element $40_n$ at a position $p_n$ in the user interface 20 indicative of an orientation $\theta_n$ from the user 110 then audio content $120_n$ for the orientation $\theta_n$ is selected for processing. The suffix n can, for example, reference any of the multiple user-selectable visual elements 40 e.g. n=i, j or k in the illustrated example.

The processing can, for example, comprise the rendering of the respective audio content 120 to the user or other processing of the audio content 120 that has been selected, such as editing, modification, sharing, sending, inclusion, attachment, storage etc.

It should be appreciated that in some examples if audio content 120 for a respective orientation θ is changed without changing the orientation θ, the appearance 50 of the user-selectable visual element 40 at the position p in the user interface 20 indicative of the orientation θ changes. This is because the multiple user-selectable visual elements 40 at positions p have an appearance 50 dependent upon audio content 120 for the orientations θ associated with the positions p. Therefore a change in audio content $120_n$ can cause a change an appearance $50_n$ of the associated user-selectable visual element $40_n$.

FIGS. 2A and 2B illustrate examples of a real space in which a user 110 has a point of view 112. The point of view 112 in the real space is measured relative to a reference 111. FIGS. 2A and 2B illustrate a change in the point of view, in the real space, of the user 110 relative to the reference 111.

FIGS. 3A and 3B illustrate an example of a virtual space. The user 110, in the virtual space, has a point of view 112 that is measured relative to a reference 111. A change in the point of view 112 in the virtual space, of the user 110, is measured relative to the reference 111. FIGS. 3A and 3B illustrate different points of view 112 in the virtual space relative to the reference 111.

Audio content 120 is associated with different orientations θ relative to a user 110. For example, audio content 120 can be rendered from the orientation θ it is associated with. The user point of view 112 can define an orientation θ, and can in this way select audio content 120 that is associated with that orientation θ. Therefore, changing the point of view 112 of the user 110 in the virtual space changes the selected audio content 120.

In some but not necessarily all examples, visual content 122 is associated with different orientations θ relative to the user 110. For example, visual content 122 can be rendered from the orientation θ it is associated with. The user point of view 112 can define an orientation θ, and can in this way select visual content 122 that is associated with that orientation θ. Therefore, changing the point of view 112 of the user 110 in the virtual space changes the selected visual content 122.

In some examples, the audio content 120 comprises sound sources in the virtual space. The positions within the virtual space of the sound sources can be a location of a sound object within the virtual space or can be a direction (orientation) of a sound source in the virtual space.

Thus, the user point of view 112 in the virtual space can be associated with visual content 122 that is dependent upon that point of view 112 (in addition to being associated with audio content 120 that is dependent upon the point of view 112). Changing the point of view 112 of the user 110 in the virtual space changes the associated visual content 122 and audio content 120.

FIG. 3A illustrates that the point of view 112 of the user 110 in the virtual space is directed towards a portion of the virtual space that corresponds to audio content $120_i$ and visual content $122_i$. In FIG. 3B, the point of view 112 of the user 110 in the virtual space is directed towards a portion of the virtual space that corresponds to audio content $120_k$ and visual content $122_k$.

In these examples, the audio content 120 is indicated as sound objects. Referring to FIG. 3A, the audio content $120_i$ is substantially aligned with the point of view 112 of the user 110 in the virtual space. The audio content $120_j$ has an orientation $\theta_i=0$ (or $|\theta_i|<\delta$) relative to the point of view 112 of the user 110 in the virtual space. The audio content $120_k$ has an orientation $\theta_k$ relative to the point of view 112 of the user 110 in the virtual space. The audio content $120_j$ has an orientation of $\theta_j$ relative to the point of view 112 of the user 110 in the virtual space.

Referring to FIG. 3B, the audio content $120_k$ is substantially aligned with the point of view 112 of the user 110 in the virtual space. The audio content $120_k$ has an orientation $\theta_k=0$ (or $|\theta_k|<\delta$) relative to the point of view 112 of the user 110 in the virtual space. The audio content $120_i$ has an orientation of $\theta_i$ relative to the point of view 112 of the user 110 in the virtual space. The audio content $120_k$ has an orientation $\theta_k$ relative to the point of view 112 of the user 110 in the virtual space.

FIG. 4A illustrates an example of the visual content $122_i$ associated with the point of view 112 illustrated in FIG. 3A. Although FIG. 4A illustrates the audio content $120_i$ as sound objects, it should be understood that these sound objects are not visible. In some circumstances the audio content $120_i$ is rendered audibly as sound objects as if positioned in the positions indicated in the figure. The positions of the audio content $120_i$ are included in FIG. 4A to illustrate that they are associated with corresponding visual features A, B in the visual content $122_i$. That is, the visual content $122_i$ includes within it visual content that is associated with the audio content $120_i$. In some circumstances the associated visual content may visualise the origin or source of the audio content $120_i$.

Figure 4B:
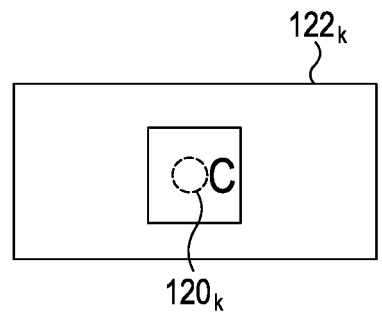

FIG. 4B illustrates an example of the visual content $122_k$ associated with the point of view 112 illustrated in FIG. 3B. Although FIG. 4B illustrates the audio content $120_k$ as sound objects, it should be understood that these sound objects are not visible. In some circumstances the audio content $120_k$ is rendered as a sound object as if positioned in the position indicated in the figure. The position of the audio content $120_k$ is included in FIG. 4B to illustrate that it is associated with a corresponding visual feature C in the visual content $122_k$. That is, the visual content $122_k$ includes within it visual content that is associated with the audio content $120_k$. In some circumstances the associated visual content may visualise the origin or source of the audio content $120_k$.

The user interface 20 illustrated in FIG. 1A can be used to represent the situation illustrated in FIG. 3A and the user interface 20 illustrated in FIG. 1B can be used to represent the situation illustrated in FIG. 3B.

The user interface 20 comprises an arrangement 30 of multiple user-selectable visual elements $40_i$, $40_j$, $40_k$ at respective positions $p_i$, $p_j$, $p_k$ in the user interface 20. The positions $p_i$, $p_j$, $p_k$ in the user interface 20 are indicative of different orientations $\theta_i$, $\theta_j$, $\theta_k$ from a user 110. In this example the user 110 in the virtual space has a position O in the user interface 20 and the angles $\theta_i$, $\theta_j$, $\theta_k$ are measured from O. The angles $\theta_i$, $\theta_j$, $\theta_k$ are defined relative to a current point of view 112 of the user 110 in the virtual space. As the point of view 112 of the user 110 in the virtual space rotates the arrangement 30 of multiple user-selectable visual elements 40 rotates. The multiple user-selectable visual elements $40_i$, $40_j$, $40_k$ have an appearance $50_i$, $50_j$, $50_k$ dependent upon respective audio content $40_i$, $40_j$, $40_k$ for the respective orientations $\theta_i$, $\theta_j$, $\theta_k$. The appearance 50 of a user-selectable visual element 40 does not change just because of the rotation.

Any of the user-selectable visual elements $40_i$, $40_j$, $40_k$ can be selected by a user. The selection can occur in any suitable way.

If the selected user-selectable visual element 40 is at a position p in the user interface 20 indicative of an orientation θ from the user 110 then audio content 120 for the orientation θ is selected for processing.

In some examples, the user point of view 112 in the virtual space can be varied via user input to the user interface 20. For example, the user can provide touch input, keystrokes, or similar.

In other examples, the user point of view 112 in the virtual space is controlled via mediated reality. In mediated reality, the user point of view 112 in the real space controls the user point of view 112 in the virtual space. Each change in the point of view 112 in the real space causes a corresponding change of the point of view 112 in the virtual space. The point of view 112 of the user 110 in virtual space illustrated in FIG. 3A corresponds to the point of view 112 of the user 110 in real space illustrated in FIG. 2A. The point of view 112 of the user 110 in virtual space illustrated in FIG. 3B corresponds to the point of view 112 of the user 110 in real space illustrated in FIG. 2B.

In all examples, the audio content 120 can be any suitable audio content. The audio content 120 can comprise only audio content or it can comprise audio content and metadata or it can comprise audio content and visual content 122. The visual content 122 can be provided as part of the audio content 120, for example, as multi-media content or can be provided separately. The visual content 122 can be a still image, a sequence of still images or a video. The visual content 122 and/or the metadata can be used to determine the visual appearance 50 of a user-selectable visual element 40.

The audio content 120 and the visual content 122, if present, can be panoramic. Panoramic in this context means that the audio and/or image extends beyond a current field of perception of the user. That is, the user 110 in the virtual space needs to adopt multiple different points of view 112 to access the whole of the audio content 120 and/or visual content 122 available at any one time.

If a user adapts a particular point of view 112, that point of view positions the field of perception. The visual content 122 for that point of view 112 is defined by the field of perception (field of view). The audio content 120 for that point of view 112 is defined by the field of perception (may be the same or different to the field of view). In a play back mode, the visual content 122 and/or the audio content 120 for the point of view 112 defined by the field of perception is rendered. The audio content 120 can be rendered in playback mode from the orientation θ it is associated with which may be offset from the point of view 112, for example.

The panoramic audio content 120 and/or visual content 122 can, for example, be two-dimensional and can extend like a cylinder for 360 degrees in a horizontal plane around the user 110 in the virtual space. In this circumstance, the point of view 112 of the user 110 is an angle in the azimuthal (horizontal) plane. The point of view 112 of the user cannot be moved out of the horizontal plane.

In other examples, the audio and/or visual content can be three-dimensional. In this example, the point of view 112 of the user 110 in the virtual space has two degrees of movement and can be moved in the horizontal plane and the vertical plane (polar and azimuth). In still other examples, the point of view 112 of the user 110 in the virtual space can have a further three degrees of freedom for defining a three-dimensional location of the point O.

If mediated reality is used to control the point of view 112 of the user 110 in the virtual space, then this may be achieved by, for example, using a 3 DoF, 3DoF+, or 6DoF system. The user 110 in the real space can, for example, wear a head tracking device that tracks movement of the user's head in space. A change in orientation of the user's head can be tracked in the azimuthal and polar directions, for example. In addition, small spatial displacements of the user's head can be tracked in some examples (3DoF+) or large translations of the user's head can be measured in some examples (6DoF). Mediated reality comprises rendering content, which may be visual content 122 and/or audio content 120, in dependence upon a real world point of view 112 of a user 110. The audio content 120 for an orientation θ is audio content 120 that would be rendered to a user 110 using mediated reality when the user 110 changes a real world point of view 112 of the user so that the real world point of view 112 of the user corresponds to the orientation θ The visual content 122 for an orientation θ is visual content 122 that would be rendered to a user 110 using mediated reality when the user 110 changes the real world point of view 112 of the user so the point of view 112 of the user in the virtual space corresponds to the orientation θ.

FIG. 15 illustrates an example of the apparatus 10 implemented as a head-mounted apparatus 300 that comprises head tracking circuitry 302. In this example, the head-mounted apparatus 300 is a head-mounted display and also comprises a display 304 mounted in front of the user's eyes for displaying visual content 122 and audio output devices 306 adjacent the user's ears for rendering audio content 120.

Referring back to FIG. 4A, it discloses an example of visual content 122, for an orientation $\theta_i$. The visual content $122_i$ is visual content that would be rendered to a user 110 when a user 110 in the virtual space changes the point of view 112 of the user so that point of view 112 corresponds to the orientation $\theta_i$. In mediated reality, this occurs when the user 110 in the real space changes a point of view 112 of the user. In order to show the association between the visual content $122_i$ for an orientation $\theta_i$ and the audio content $120_i$ for an orientation $\theta_i$, the audio content $120_i$ is also illustrated in FIG. 4A. In the example of FIG. 4A the audio content $120_i$ is associated with a portion A of the visual content $122_i$ and other audio content $120_j$ is associated with another portion B of the visual content $122_i$.

Referring back to FIG. 4B, it discloses an example of visual content $122_k$ for an orientation $\theta_k$. The visual content $122_k$ is visual content that would be rendered to a user 110 when a user 110 in the virtual space changes a point of view 112 of the user so the point of view 112 of the user corresponds to the orientation θ. In mediated reality, this occurs when the user 110 in the real space changes a point of view 112 of the user. In order to show the association between the visual content $122_k$ for an orientation $\theta_k$ and the audio content $120_k$ for an orientation $\theta_k$, the audio content $120_k$ is also illustrated in FIG. 4B. In the example of FIG. 4B the audio content $120_k$ is associated with a portion C of the visual content $122_k$.

Referring to FIG. 1A, the user-selectable visual element $40_i$, $40_j$, $40_k$ at a position $p_i$, $p_j$, $p_k$ indicative of an orientation $\theta_i$, $\theta_j$, $\theta_k$ from a user 110 has a visual appearance $50_i$, $50_j$, $50_k$ dependent upon visual content $122_i$, $122_j$, $122_k$ for the respective orientation $\theta_i$, $\theta_j$, $\theta_k$.

The audio content 120 determines the orientations $\theta_i$, $\theta_j$, $\theta_k$. The orientations $\theta_i$, $\theta_j$, $\theta_k$ in turn determine the visual content $122_i$, $12_j$, $122_k$. Consequently, if a user-selectable visual element 40 has an appearance 50 dependent upon visual content 122 for an orientation $\theta$ then that appearance is also dependent upon audio content 120 for that orientation $\theta$.

Figure 5A:
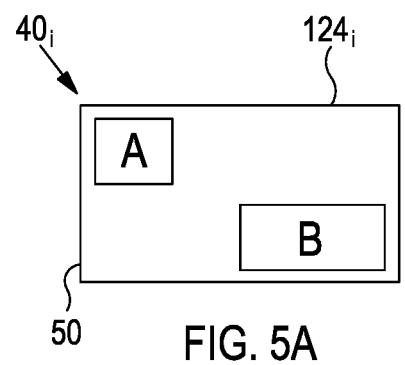
FIG. 5A & FIG. 5B show an example of the subject matter described herein.
Figure 5B:
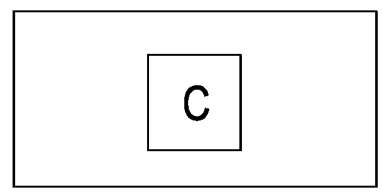

As illustrated in the example of FIGS. 5A and 5B, the user-selectable visual element 40 at a position p indicative of an orientation $\theta$ from a user 110 has an appearance 50 that comprises a visual extract 124 of visual content 122 for the orientation $\theta$. FIG. 5A illustrates a user-selectable visual element $40_i$ that comprises visual extract $124_i$ of visual content $122_i$ illustrated in FIG. 4A. In this example, the visual extract $124_i$ is a full field of view visual extract. The field of view in the visual extract $124_i$ corresponds to the field of view of the visual content $122_i$, however, the resolution is significantly reduced. FIG. 5B illustrates a user-selectable visual element $40_k$ that comprises visual extract $124_k$ of visual content $122_k$ illustrated in FIG. 4B. In this example, the visual extract $124_k$ is a partial field of view visual extract. The field of view in the visual extract $124_k$ corresponds to only a cropped part of the field of view of the visual content $122_i$ (a cropped region). The resolution can be the same or reduced.

The visual extract 124 of visual content 122 for an orientation $\theta$ can comprise an image for the orientation $\theta$, a looped clip of video for the orientation $\theta$, a repeated sequence of images for the orientation $\theta$ or similar.

In some, but not necessarily all examples, characteristics of an appearance 50 of a user-selectable visual element 40 are indicative of characteristics of audio content 120 selectable via the user-selectable visual element 40. For example, the characteristics of the audio content 120 can be dependent upon one or more parameters including: a number of sound sources, spatial separation of sound sources, amplitude of sound sources, direction of sound sources, quality of sound sources, changeability of sound sources.

The characteristics of the audio content 120 can for example be determined from metadata comprised in or associated with the audio content 120. Alternatively, or in addition, characteristics of the audio content 120 can, for example, be determined by analysis of the audio content 120. For example, beam-forming analysis of the audio content 120 can be used to identify and position sound sources and to then determine the number of sound sources, the spatial separation of sound sources, the amplitude of sound sources, the direction of sound sources, the quality of sound sources, the changeability of sound sources.

The characteristics of an appearance 50 of a user-selectable visual element 40 can include, for example, any one or more of a size of the user-selectable visual element 40, brightness, colouration, blurred edges and the use of moving or still images.

Figure 6:
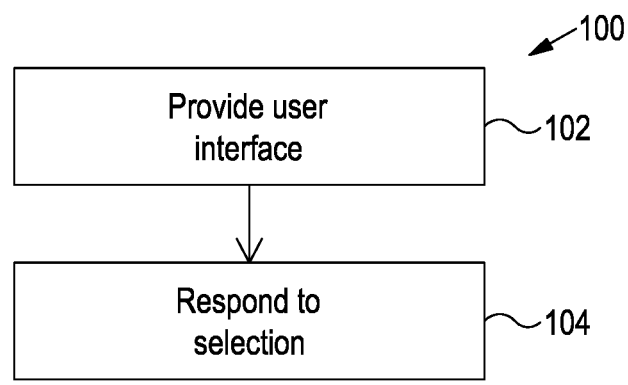
FIG. 6 shows another example of the subject matter described herein.

FIG. 6 illustrates an example of a method 100 comprising: at block 102 providing a user interface 20 for enabling a user 110 to select audio content 120. The user interface 20 comprises an arrangement 30 of multiple user-selectable visual elements 40 at positions p in the user interface 20 that are indicative of different orientations $\theta$ from the user 110 and have an appearance 50 dependent upon audio content 120 for the respective orientations $\theta$.

The method 100 then comprises, at block 104, responding to selection of a user-selectable visual element 40 at a position p in the user interface 20 indicative of an orientation $\theta$ from the user 110 to select, for processing, audio content 120 for the orientation $\theta$. The selection of the user-selectable visual element 40 is by user actuation. Where the user interface 20 is displayed in mediated reality, the actuation may be a gesture within the virtual space or some other action within the virtual space. Where the user interface 20 is displayed on a touchscreen, the actuation may be touching a portion of the touchscreen that corresponds to a user-selectable visual element 40.

Applying the method 100 to the example of the user interface 20 illustrated in FIGS. 1A and 1B, a first user-selectable visual element $40_i$ has a first position $p_i$ in the user interface 20 indicative of a first orientation $\theta_i$ from the user 110 and has a first appearance $50_i$ dependent upon first audio content $120_i$ (not illustrated) for the first orientation $\theta_i$, a second user-selectable visual element $40_j$ has a second position $p_j$ in the user interface 20 indicative of a second orientation $\theta_j$ from the user and has a second appearance $50_j$ dependent upon the second audio content $120_j$ (not illustrated) for the second orientation $\theta_j$ and a third user-selectable visual element $40_k$ has a third position $p_k$ in the user interface 20 indicative of a third orientation $\theta_k$ from the user 110 and has a third appearance $50_k$ dependent upon third audio content $120_k$ (not illustrated) with a third orientation $\theta_k$.

The apparatus 10 is configured to respond to actuation of the first user-selectable visual element $40_i$ to select the first audio content $120_i$ (but not the second audio content $120_j$ or the third audio content $120_k$); respond to user selection of the second user-selectable visual element $40_j$ to select the second audio content $120_j$ (but not the first audio content $120_i$ or the third audio content $120_k$); and respond to user selection of third user-selectable visual element $40_k$ to select the third audio content $120_k$ (but not the first audio content $120_i$ or the second audio content $120_j$).

In this example, the first audio content $120_i$ is different to the second audio content $120_j$ and the third audio content $120_k$. The first user-selectable visual element $40_i$ has a first appearance $50_i$ different to the second appearance $50_j$ of the second user-selectable visual element $40_j$ and the third appearance $50_k$ of the third user-selectable visual element $40_k$.

If only the first audio content $120_i$ is changed without changing the first orientation $\theta_i$, the first appearance $50_i$ of the first user-selectable visual element $40_i$ changes and the second appearance $50_j$ of the second user-selectable visual element $40_j$ does not change and the third appearance $50_k$ of the third user-selectable visual element $40_k$ does not change. Likewise, if only the second audio content $120_j$ is changed, without changing the second orientation $\theta_j$, the second appearance $50_j$ of the second user-selectable visual element $40_j$ changes and the appearance $50_1$ of the first user-selectable visual element $40_1$ does not change and the appearance $50_k$ of the third user-selectable visual element $40_k$ does not change.

Figure 7:
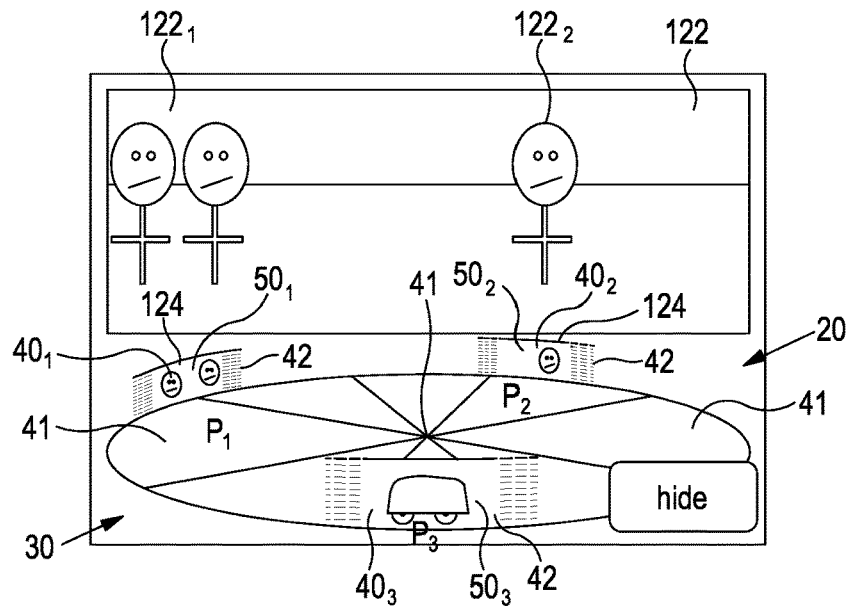
FIG. 7 shows another example of the subject matter described herein.

As previously described, the user interface 20 comprises an arrangement of multiple user-selectable visual elements 40 at positions p in the user interface 20. In some examples, the user-selectable visual elements 40 comprise a first portion 41 and a second portion 42 (for example as illustrated in FIG. 7). The first portion 41 is an asymmetric wedge shape and is indicative of an orientation $\theta$ from a user. The mid-line of reflection symmetry of the wedge is aligned with orientation $\theta$. The second portion 42 that has an appearance 50 dependent upon audio content 120 for the orientation θ. The appearance 50 of the second portion 42 of the user-selectable visual element 40 can be as described in the preceding paragraphs for the appearance of the user-selectable visual element 40. In some, but not necessarily all examples, user selection of either the first portion 41 or the second portion 42 of a user-selectable visual element 40 causes user selection of the user-selectable visual element 40. In other examples, user selection of the second portion 42 (but not necessarily the first portion 41) of the user-selectable visual element 40 causes user selection of the user-selectable visual element 40.

The user-selectable visual element 40 has the first portion 41 and the second portion 42 at positions in the user interface 20 that are indicative of an orientation from the user 110. A line along orientation θ bi-sects both.

In some, but not necessarily all examples, the first portion 41 represents a segment of a circle. The characteristics of the appearance of the segment can include segment size (area), width (angle subtended at the point O), length (radial distance from the point O).

In the example illustrated, the segments 41 are regularly sized segments each of which corresponds to a particular orientation θ. Only some of the segments 41 are associated with audio content and have corresponding user-selectable visual elements 40. Therefore, some of the segments 41 are empty and provide gaps between the other user-selectable visual elements 40.

The upper portion of FIG. 7 illustrates a portion of visual content 122. The visual content comprises visual content $122_1$, $122_2$, $122_3$ associated with different respective points of view $112_1$, $112_2$, $112_3$ (not illustrated in FIG. 7) and with different respective audio content $120_1$, $120_2$, $120_3$ (not illustrated in FIG. 7). The visual content 122 is oriented with respect to a current (variable) point of view 112 (not illustrated in FIG. 7) of the user. The respective points of view $112_1$, $112_2$, $112_3$ have different orientations $\theta_1$, $\theta_2$, $\theta_3$ (not illustrated in FIG. 7) from the current point of view. In this example, the portion of visual content 122 illustrated comprises visual content $122_1$, $122_2$, (not visual content $122_3$). The visual content $122_1$ visualizes an origin or source of the audio content $120_1$ at orientation $\theta_1$ and the visual content $122_2$ visualizes an origin or source of the audio content $120_2$ at orientation $\theta_2$. As the current point of view 112 of the user changes the orientations $\theta_1$, $\theta_2$ change.

The lower portion of FIG. 7 illustrates a user interface 20 for enabling a user to select audio content $120_1$, $120_2$, $120_3$. The user interface 20 comprises an arrangement 30 of multiple user-selectable visual elements $40_1$, $40_2$, $40_3$ at respective positions $p_i$, $p_2$, $p_3$ in the user interface 20 that are indicative of different respective orientations $\theta_i$, $\theta_2$, $\theta_3$ from the user 110 (not illustrated in FIG. 7).

The user-selectable visual element $40_1$ at a position $p_1$ indicative of an orientation $\theta_1$ from the user 110 has an appearance $50_1$ dependent upon the audio content $120_1$ for the respective orientation $\theta_1$ because it comprises a visual extract 124 of the visual content $122_1$ for the orientation $\theta_1$. This extract 124 visualizes an origin or source of the audio content $120_1$ at orientation $\theta_1$.

The user-selectable visual element $40_2$ at a position $p_2$ indicative of an orientation $\theta_2$ from the user 110 has an appearance $50_2$ dependent upon the audio content $120_2$ for the respective orientation $\theta_2$ because it comprises a visual extract 124 of the visual content $122_2$ for the orientation $\theta_2$. This extract 124 visualizes an origin or source of the audio content $120_2$ at orientation $\theta_2$.

The user-selectable visual element $40_3$ at a position $p_3$ indicative of an orientation $\theta_3$ from the user 110 has an appearance $50_3$ dependent upon the audio content $120_3$ for the respective orientation $\theta_3$ because it comprises a visual extract 124 of the visual content $122_3$ for the orientation $\theta_3$. This extract 124 visualizes an origin or source of the audio content $120_3$ at orientation $\theta_3$.

User-selection of a user-selectable visual element $40_1$, $40_2$, $40_3$ at a position $p_1$, $p_2$, $p_3$ in the user interface 20 indicative of an orientation $\theta_1$, $\theta_2$, $\theta_3$ from the user 110 causes selection, for processing, of respective audio content $120_1$, $120_2$, $120_3$ for the orientation $\theta_1$, $\theta_2$, $\theta_3$. Thus, user-selection of the user-selectable visual element $40_1$ at position $p_1$ in the user interface 20 that is indicative of the orientation $\theta_1$ causes selection, for processing, of the audio content $120_1$ at orientation $\theta_1$. Thus, user-selection the user-selectable visual element $40_2$ at position $p_2$ in the user interface 20 that is indicative of the orientation $\theta_2$ causes selection, for processing, of the audio content $120_2$ at orientation $\theta_2$. Thus, user-selection the user-selectable visual element $40_3$ at position $p_3$ in the user interface 20 that is indicative of the orientation $\theta_3$ causes selection, for processing, of the audio content $120_3$ at orientation $\theta_3$.

In the example illustrated in FIG. 7, the arrangement 30 of multiple user-selectable visual elements 40 comprises an ellipse representing a circle viewed from an elevated perspective. The effective user position O is at a midpoint between the focal points of the ellipse. This corresponds to the centre of the circle. As described previously, this circle can be segmented to produce first portions 41 of the multiple user-selectable visual elements 40. Each of the multiple segments has a width and a centre vector through the point O. The centre vector is aligned with an orientation θ from a user.

In this example, the second portion 42 of a user-selectable visual element 40 is a visual cue to a consequence of user selection of the user-selectable visual element 40. The characteristics of appearance 50 of the second portion 42 of the user-selectable visual element 40 include, for example size, brightness, colouration, blurred edges and whether or not the extracted visual content, the visual extract 124, is video or a still image.

Figure 8A:
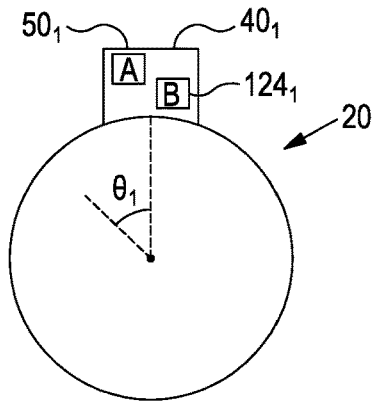
FIG. 8A & FIG. 8B show an example of the subject matter described herein.
Figure 8B:
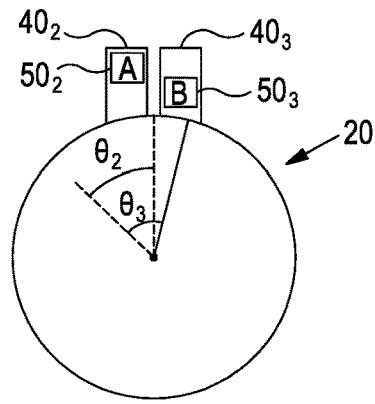

FIGS. 8A and 8B illustrate an optional feature of the user interface 20. FIG. 8 broadly corresponds to FIG. 1A and illustrates a user interface 20 that comprises a user-selectable visual element $40_1$ that has an appearance $50_1$. This user-selectable visual element $40_1$ corresponds to the user-selectable visual element $40_i$ illustrated in FIG. 1A. The other aspects of FIG. 1A are not illustrated for clarity of view. As illustrated in FIG. 8A, the appearance $50_1$ of the user-selectable visual element $40_1$ comprises a visual extract $124_1$ (FIG. 5A) from the visual content for the orientation $\theta_1$ (FIG. 4A). In this example the apparatus 10 does not respond to selection of the user-selectable visual element $40_1$ by immediately and automatically processing the audio content $120_1$ associated with the orientation $\theta_1$, as previously described, instead, the apparatus 10 responds to selection of the user-selectable visual element $40_1$ at a position $p_1$ in the user interface 20 indicative of an orientation $\theta_1$ from the user 110 to adapt the arrangement 30 of multiple user-selectable visual elements 40 to include more user-selectable visual elements $40_2$, $40_3$ at positions $p_2$, $p_3$ in the user interface 20 that are indicative of different orientations $\theta_2$, $\theta_3$ from a user 110 and have an appearance dependent upon audio content $120_2$, $120_3$ for the respective orientations $\theta_2$, $\theta_3$. The apparatus 10 is then configured to respond to selection of a user-selectable visual element $40_2$, $40_3$ at a position $p_2$, $p_3$ in the user interface 20 indicative of an orientation $\theta_2$, $\theta_3$ from the user to select audio content $120_2$, $120_3$ for the orientation $\theta_2$, $\theta_3$.

As was previously described in relation to FIGS. 4 and 5, a user-selectable visual element, such as the user-selectable visual element $40_1$ in FIG. 8A, can be based upon visual content 122 that includes multiple visual features (e.g. A, B in FIG. 4A) associated with different audio content, for example, different sound objects. When this user-selectable visual element $40_1$ is selected, the user-selectable visual element $40_1$ is split into multiple different user-selectable visual elements $40_2$, $40_3$. The user-selectable visual element $40_2$ is at an orientation $\theta_2$ that is determined by a sound source corresponding to visual feature A and visual content 122 (e.g. feature A) determined by that sound source is illustrated in the user-selectable visual element $40_2$. The user-selectable visual element $40_3$ is at an orientation $\theta_3$ that is determined by a sound source corresponding to visual feature C and visual content 122 (e.g. feature B) determined by that sound source is illustrated in the user-selectable visual element $40_2$.

Referring back to the example of the user interface 20 illustrated in FIG. 7 (with reference also to FIGS. 5A and 5B), each of the multiple user-selectable visual elements 40 of the user interface 20 has an appearance 50 determined by a visual extract 124 of visual content 122 where the extraction is by cropping and the visual extract 124 is a cropped region 124 of video segments of panoramic video (visual content 122). The visual extracts (cropped regions) 124 are from directions θ of the panoramic video 122 corresponding to directions θ from where audio content 120 is heard in the panoramic video 122. In the example illustrated in FIG. 7, a van engine is making sounds to a rear of the user 110. As a consequence, there is an sound source for audio content 120 to the rear of the user 110. As a consequence of this there is a user-selectable visual element 40 at a position p in the user interface 20 that corresponds with a position to a rear of the user. The appearance 50 of this user-selectable visual element 40 is dependent upon the audio content 120 at the rear of the user. In this example, it has an appearance 50 based upon a visual extract 124 (cropped regions of the panoramic video 122) that includes the van that is making the sound heard from the rear of the user 110. Thus, the back region of the video is cropped and shown on the user-selectable visual element 40 positioned on the ellipse defined by the user interface 20. The user 110 can then click on the user-selectable visual element 40, for example by clicking on the cropped video segment, or can click on a corresponding portion of the ellipse, to select a focus direction, that is to select the audio content 120 that corresponds to that direction θ.

In this example, the appearance 50 of the user-selectable visual element 40 (visual extract 124) is rendered so that the properties of the selectable audio content 120 associated with that user-selectable visual element 40 are indicated. For example:

i) a width of the user-selectable visual element 40 can, for example, reflect a width of the audio content 120 for that orientation. Thus, the user is able to tell from the appearance 50 of the user-selectable visual element 40 which sound sources 120 will be present in the audio content 120 selectable via this user-selectable visual element 40. For example, as illustrated in FIG. 5A, the appearance 50 of the user-selectable visual element 40 indicates that the selectable audio content 120 comprises two distinct sound sources, one associated with the visual feature A and another associated with the visual feature B.

ii) In some, but not necessarily all, examples, if a precise audio beam is possible in a direction θ, then the appearance of the user-selectable visual element 40 can have sharp edges, otherwise the edges of the user-selectable visual element 40 are blurred. A similar or different modification to the appearance 50 of the user-selectable visual element 40 can in addition or alternatively be used to indicate an intensity of the audio content. Thus, the appearance 50 of the user-selectable visual element 40 can give an indication of the quality of the audio content 120 that is selectable via the user-selectable visual element 40.

iii) In some but not necessarily all examples, a size or other visual appearance 50 of the user-selectable visual element 40 can indicate an intensity or quality of the audio content 120 that is selectable via the user-selectable visual element 40.

As has been previously mentioned, in some but not necessarily all examples, the apparatus 10 is configured to analyse the audio content 120. This analysis enables the appearance 50 of a user-selectable visual element 40 for orientation θ to be dependent upon audio content for the orientation θ.

Figure 9:
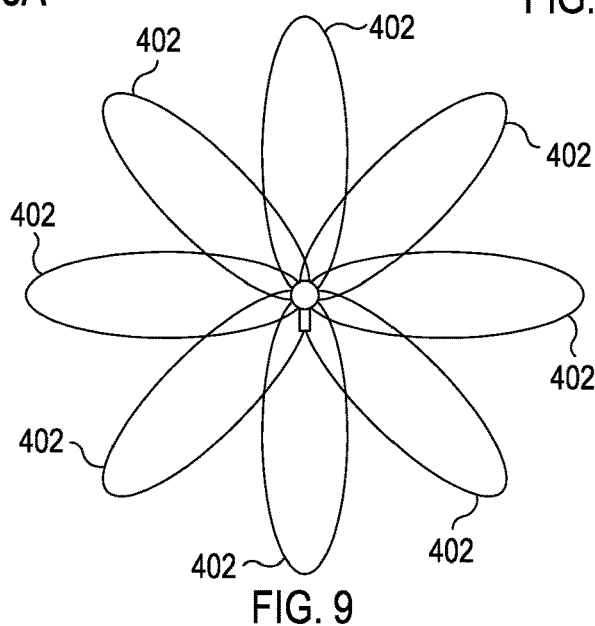
FIG. 9 shows another example of the subject matter described herein.

For example, audio beam forming may be performed on the audio content 120 for beams 402 to several directions as illustrated in FIG. 9. Signal energies are calculated for the beam forming signals. If the signal energy in a particular direction θ is greater than a set threshold, a visual extract 124 (e.g. a cropped region of the panoramic video 122) is used as a user-selectable visual element 40 at the corresponding position 6 on the ellipse of the user interface 20. In this example, a sharpness (appearance 50) of the edges of the visual extract 124 (the cropped region) can be determined by how much over the threshold the signal energy is. The higher the energy, the sharper the edge.

In some examples, the beams 402 are fixed and the beams have a fixed size, orientation and spacing. In other examples the size of the beams 402 can be varied and in some examples optimized for the audio content 120.

In some examples, if adjacent beams 402 in different directions θ have high energy, then the multiple beams can be represented by a single wide user-selectable visual element 40 positioned on the ellipse of the user interface 20. The width of the single wide user-selectable visual element 40 extends over the different directions θ of the adjacent beams 402. In this example, the user 110 can select the wide user-selectable visual element 40 to select a wide audio segment that corresponds to the multiple beams. In this example, the user 110 can select different portions of the wide user-selectable visual element 40 to select one or more of the multiple beams. In this example, the user 110 can select the wide user-selectable visual element 40 to be presented with a user-selectable visual element 40 on the ellipse of the user interface 20 for each beam. Each of these narrow user-selectable visual elements 40 for a beam 402 extends over the direction θ for the beam 402. The user 110 can select a narrow user-selectable visual element 40 to select a narrow audio segment that corresponds to a single beam. In some examples, the user interface 20 can indicate "component" directions of beams that are comprised within a group of beams, after the user-selectable visual element 40 for the group is selected by the user.

In this or other examples, audio metadata can be used to determine a sharpness of edges of a user-selectable visual element 40.

For example, a variation (variants, or standard deviation or other suitable fluctuation metric) of a direction of arrival of a sound can be used to adjust a sharpness and/or a width of the user-selectable visual element 40.

For example, the greater a ratio of direct sound energy to ambient or reverberant energy in a direction θ, the sharper the user-selectable visual element 40 for that direction θ.

For example, the smaller a ratio of direct sound energy to ambient or reverberant energy in a direction θ, the less sharp the user-selectable visual element 40 for that direction θ.

For example, parametric spatial audio data can comprise direction and ratio metadata at time-frequency tiles. Such metadata can be formed by dividing the audio content 120 into short time frames and the spectrum for each time frame is analysed yielding a time-frequency tile representation. For each time-frequency tile, at least one dominant direction of arrival (DOA) of dominant sound is analysed for example via time-delay of arrival to a defined microphone and at least one energy ratio parameter is analysed e.g. the ratio of direct sound energy to ambient sound energy. The strong directional sounds can be determined to be in the locations of most common direction of arrival values for example by creating a histogram for direction of arrival values. The variation (variants, or standard deviation or other suitable fluctuation metric) of the direction of arrival values around a determined sound source direction of arrival can be used for adjusting a sharpness and/or a width of the user-selectable visual element 40. In addition, the radio metadata can affect an appearance 50 (sharpness) of the user-selectable visual element 40 so that the larger the ratio of direct sound energy to ambient energy in direction estimates corresponding to a determined source, the sharper the visual extract 124 (the cropped region).

Figure 10A:
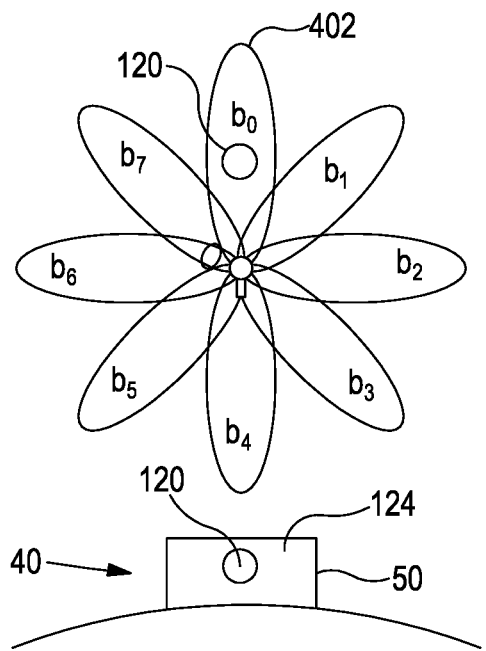
Figure 10B:
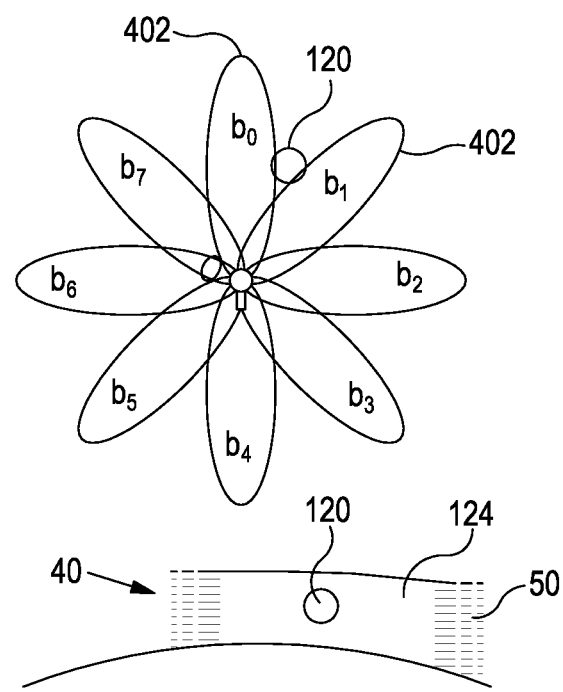
Figure 10C:
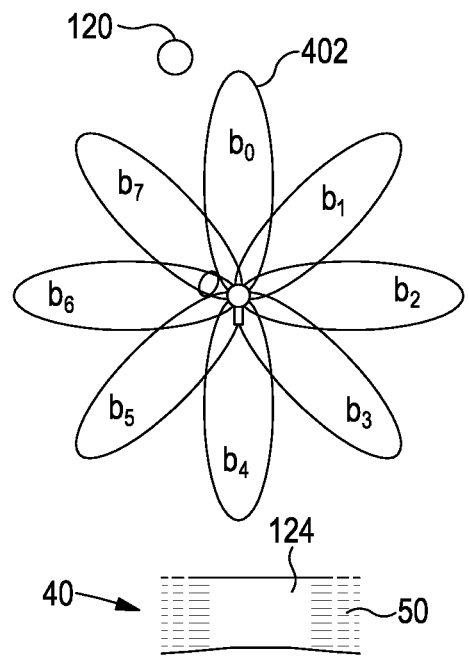

In the examples in FIG. 10A-10C, the audio content 120 is provided by sound sources in the virtual space. In these examples, the virtual space and the sound sources are illustrated in two-dimensions. In other examples, the virtual space is three-dimensional and the sound sources have different three-dimensional positions within the virtual space.

A sound source (e.g. a person) that provides audio content 120 is somewhere in front of a recording device at O. Depending on how well the sound source audio is recorded in the different beamformed audio signals (focus signals) 402, the visual extract 124 (e.g. crop region) of the user-selectable visual element 40 is created differently. In these examples, an appearance 50 of an edge of the user-selectable visual element 40 is used to indicate a quality of the associated audio content 120. If the audio content 120 is of higher quality the edges are sharper and better defined. If the audio content is of lower quality the edges are less sharp and are blurred.

In FIG. 10A, the sound source that provides audio content 120 is directly in the middle of a beam 402 and is recorded well. The visual extract 124 (e.g. the cropped region) of the user-selectable visual element 40 is narrow and has sharp edges.

In FIG. 10B, the sound source that provides audio content 120 is in the middle of two beams 402. The sound source that provides audio content 120 is recorded in both beams but not very loudly in either one (low energy). Thus, the visual extract 124 (e.g. the cropped region) 124 is wide and has blurry edges.

In FIG. 10C, the sound source that provides audio content 120 is farther away, and recorded partially in one beam 402. The visual extract 124 (e.g. the cropped region) is narrow and has blurred edges. The user 110 can see that the sound source that provides audio content 120 is not centered in the focus beam 402 in this direction.

Figure 11A:
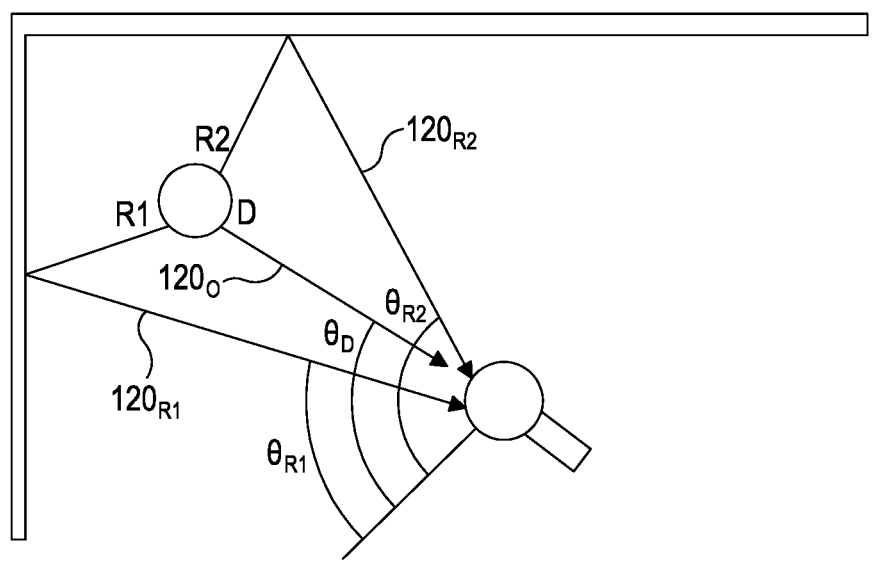
FIG. 11A & FIG. 11B show an example of the subject matter described herein.

In FIG. 11A, audio is generated from a single source but is reflected from nearby walls. There are therefore three sound sources—one direct sound source D and two reflected sound sources R1, R2. The direct sound source D produces audio content $120_D$ associated with an orientation/direction $\theta_D$. The reflected sound source R1 produces audio content $120_{R1}$ associated with an orientation/direction $\theta_{R1}$. The reflected sound source R2 produces audio content $120_{R2}$ associated with an orientation/direction $\theta_{R2}$.

Figure 11B:
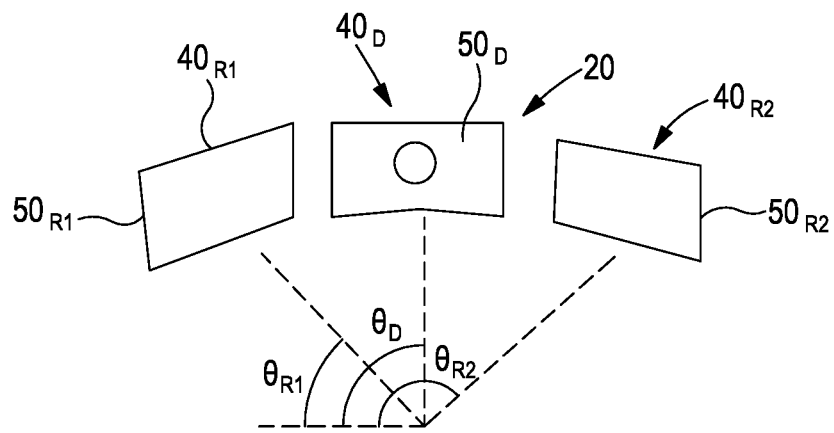

FIG. 11B illustrates the corresponding user interface 20.

There is a user-selectable visual element $40_D$ at an orientation $\theta_D$ in the user interface 20 that has an appearance $50_D$ dependent upon audio content $120_D$ associated with the respective orientation $\theta_D$. The visual extract $124_D$ in the user-selectable visual element $40_D$ shows a person speaking.

There is a user-selectable visual element $40_{R1}$ at an orientation $\theta_{R1}$ in the user interface 20 that has an appearance $50_{R1}$ dependent upon audio content $120_{R1}$ associated with the respective orientation $\theta_{R1}$. The visual extract $124_{R1}$ in the user-selectable visual element $40_{R1}$ only shows a wall.

There is a user-selectable visual element $40_{R2}$ at orientation $\theta_{R2}$ in the user interface 20 that has an appearance $50_{R2}$ dependent upon audio content $120_{R2}$ associated with the respective orientation $\theta_{R2}$. The visual extract $124_{R2}$ in the user-selectable visual element $40_{R2}$ only shows a wall.

The user can easily see from the appearance $50_{R1}$, $50_{RD}$, $50_{R2}$ of the user-selectable visual elements $40_{R1}$, $40_D$, $40_{R2}$ that two of the three focus directions θ are not pointing towards the sound source (the speaking person).

The user 110 is now able to select the user-selectable visual element $40_D$ where the person is seen for the focus direction θ. This selects the audio content $120_D$ for processing.

Alternatively, if the user 110 wants to also hear the reflections, the user 110 selects the user-selectable visual elements $40_{R1}$, $40_D$, $40_{R2}$. This selects the audio content $120_{R1}$, $120_D$, $120_{R2}$ for processing.

As will be appreciated from the foregoing, a direction estimate a for a sound can be slightly off from a correct direction where the sound source can be seen (e.g. because of reverberation/reflections). In some but not necessarily all examples, a user-selectable visual elements 40 can be extended until the corresponding visual extract 124 includes an image of the sound source. The direction of extension can, for example, be determined using image processing and/or audio processing. For example, the user-selectable visual elements 40 can be extended towards the closest image of the sound source or towards a strong nearby sound source.

In some examples, for example as illustrated in FIG. 7, the user interface 20 arranges the user-selectable visual elements 40 at a perimeter of an ellipse. There is a cylindrical visualization of panoramic video along at least parts of the perimeter of the ellipse. This is achieved by rendering visual extracts 124 (e.g. the cropped regions) 124 of the video on the perimeter of the ellipse. The visual extracts 124 (e.g. the cropped regions), their position p and their appearance 50 can be automatically determined based on analysis of the audio content 120 or its metadata. For example, the shape and sharpness of a visual extract 124 (e.g. a cropped region) for a direction θ can indicate quality of the audio content 120 for the direction θ. The user 110 can select the focus direction θ by selecting the user-selectable visual element 40. Actual estimated directions θ are used for selecting focus direction θ.

FIG. 12 illustrates an example of an apparatus 10 comprising controller 210 that is configured to provide the user interface 20 and user input 212 for providing user input to the controller for user selection of a user-selectable visual element 40. The user interface 20 is provided via a display 214. In some but not necessarily all examples, the display 214 is a touch-sensitive display and also provides the user input 212.

FIG. 13 illustrates an example of a controller 210. Implementation of the controller 210 may be as controller circuitry. The controller 210 may be implemented in hardware alone, have certain aspects in software including firmware alone or can be a combination of hardware and software (including firmware).

As illustrated in FIG. 13 the controller 210 may be implemented using instructions that enable hardware functionality, for example, by using executable instructions of a computer program 204 in a general-purpose or special-purpose processor 200 that may be stored on a computer readable storage medium (disk, memory etc) to be executed by such a processor 200.

The processor 200 is configured to read from and write to the memory 202. The processor 200 may also comprise an output interface via which data and/or commands are output by the processor 200 and an input interface via which data and/or commands are input to the processor 200.

The memory 202 stores a computer program 204 comprising computer program instructions (computer program code) that controls the operation of the apparatus 10 when loaded into the processor 200. The computer program instructions, of the computer program 204, provide the logic and routines that enables the apparatus to perform the methods illustrated in Figs. The processor 200 by reading the memory 202 is able to load and execute the computer program 204.

The apparatus 10 therefore comprises:
at least one processor 200; and
at least one memory 202 including computer program code
the at least one memory 202 and the computer program code configured to, with the at least one processor 200, cause the apparatus 10 at least to perform:
providing a user interface 20, for enabling a user to select audio content, comprising an arrangement of multiple user-selectable visual elements, at positions in the user interface 20 that are indicative of different orientations from a user, that have an appearance dependent upon audio content for the respective orientations; and
responding to selection of a user-selectable visual element at a position in the user interface 20 indicative of an orientation from the user to select, for processing, audio content for the orientation.

As illustrated in FIG. 14, the computer program 204 may arrive at the apparatus 10 via any suitable delivery mechanism 206. The delivery mechanism 206 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 204. The delivery mechanism may be a signal configured to reliably transfer the computer program 204. The apparatus 10 may propagate or transmit the computer program 204 as a computer data signal.

Computer program instructions for causing an apparatus to perform at least the following or for performing at least the following:
providing a user interface 20, for enabling a user to select audio content, comprising an arrangement of multiple user-selectable visual elements, at positions in the user interface 20 that are indicative of different orientations from a user, wherein each user-selectable visual element has an appearance dependent upon audio content for a respective orientation; and responding to selection of a user-selectable visual element at a position in the user interface 20 indicative of an orientation from the user to select, for processing, audio content for the orientation.

The computer program instructions may be comprised in a computer program, a non-transitory computer readable medium, a computer program product, a machine readable medium. In some but not necessarily all examples, the computer program instructions may be distributed over more than one computer program.

Although the memory 202 is illustrated as a single component/circuitry it may be implemented as one or more separate components/circuitry some or all of which may be integrated/removable and/or may provide permanent/semi-permanent/dynamic/cached storage.

Although the processor 200 is illustrated as a single component/circuitry it may be implemented as one or more separate components/circuitry some or all of which may be integrated/removable. The processor 200 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:
(a) hardware-only circuitry implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions and
(c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the Figs may represent steps in a method and/or sections of code in the computer program 204. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

The above described examples find application as enabling components of:

automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer and exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:
   at least one processor; and
   at least one memory including computer program code,
   the at least one memory and the computer program code configured to, with the at least one processor,
   cause the apparatus to perform at least the following:
      provide a user interface, for enabling a user to select audio content, wherein the user interface comprises an arrangement of multiple user-selectable visual elements, at positions in the user interface that are indicative of different orientations from a user, wherein the user-selectable visual elements have an appearance dependent upon audio content for the respective orientations; and
      respond to selection of a user-selectable visual element at a position in the user interface indicative of an orientation from the user to select, for processing, audio content for the orientation, wherein in an instance in which the audio content for the orientation is changed without changing the orientation from the user, the apparatus is caused to change an appearance of the user-selectable visual element at the position in the user interface indicative of the orientation,
      wherein the user-selectable visual elements of the arrangement comprise a first portion that is asymmetric and indicative of an orientation from a user and a second portion that has an appearance dependent upon audio content for the orientation, and wherein the first portion represents a segment of a circle having characteristics of appearance comprising one or more of segment size, width or length.

2. The apparatus as claimed in claim 1, wherein at least one of the multiple user-selectable visual elements, at a position indicative of the orientation from the user, is configured to have an appearance that comprises a visual extract of visual content for the orientation that is dependent upon the audio content for the orientation.

3. The apparatus as claimed in claim 2, wherein the visual extract of the visual content for the orientation comprises an image for the orientation, a looped clip of video for the orientation, or a repeated sequence of images for the orientation.

4. The apparatus as claimed in claim 2, wherein the visual content for the orientation is visual content that would be rendered to the user using mediated reality when the user changes a real world point of view of the user so the real world point of view of the user corresponds to the orientation, wherein the mediated reality comprises rendering content in dependence upon the real world point of view of the user.

5. The apparatus as claimed in claim 1, wherein the audio content for an orientation is audio content that would be rendered to the user using mediated reality when the user changes a real world point of view of the user so that the real world point of view of the user corresponds to the orientation, wherein the mediated reality comprises rendering content in dependence upon a real world point of view of the user.

6. The apparatus as claimed in claim 5, comprising a head-mounted apparatus for rendering the user interface.

7. The apparatus as claimed in claim 1, wherein a first user-selectable visual element of the arrangement has a first position in the user interface indicative of a first orientation from the user and has a first appearance dependent upon first audio content for the first orientation, wherein a second user-selectable visual element of the arrangement has a second position in the user interface indicative of a second orientation from the user and has a second appearance dependent upon second audio content for the second orientation,
wherein the apparatus is configured to: respond to actuation of the first user-selectable visual element to select the first audio content but not the second audio content, and to respond to user selection of the second user-selectable visual element to select the second audio content but not the first audio content.

8. The apparatus as claimed in claim 1, wherein one or more characteristics of the appearance of the user-selectable visual element is indicative of one or more characteristics of the audio content selectable via the user-selectable visual element.

9. The apparatus as claimed in claim 1, wherein the second portion has characteristics of the appearance comprises one or more of:
size, brightness, coloration, blurred edges, or image content.

10. A method comprising:
providing a user interface, for enabling a user to select audio content, comprising an arrangement of multiple user-selectable visual elements, at positions in the user interface that are indicative of different orientations from a user, wherein each user-selectable visual element has an appearance dependent upon audio content for a respective orientation; and
responding to selection of a user-selectable visual element at a position in the user interface indicative of an orientation from the user to select, for processing, audio content for the orientation, wherein in an instance in which the audio content for the orientation is changed without changing the orientation from the user, the apparatus is caused to change an appearance of the user-selectable visual element at the position in the user interface indicative of the orientation,
wherein the user-selectable visual elements of the arrangement comprise a first portion that is asymmetric and indicative of an orientation from a user and a second portion that has an appearance dependent upon audio content for the orientation, and
wherein the first portion represents a segment of a circle having characteristics of appearance comprising one or more of segment size, width or length.

11. The method as claimed in claim 10, wherein at least one of the multiple user-selectable visual elements, at a position indicative of an orientation from a user, is configured to have an appearance that comprises a visual extract of visual content for the orientation that is dependent upon the audio content for the orientation.

12. The method as claimed in claim 11, wherein the visual extract of the visual content for the orientation comprises an image for the orientation, a looped clip of video for the orientation, or a repeated sequence of images for the orientation.

13. The method as claimed in claim 11, wherein the visual content for the orientation is visual content that would be rendered to the user using mediated reality when the user changes a real world point of view of the user so the real world point of view of the user corresponds to the orientation, wherein the mediated reality comprises rendering content in dependence upon the real world point of view of the user.

14. The method as claimed in claim 10, wherein the audio content for an orientation is audio content that would be rendered to the user using mediated reality when the user changes a real world point of view of the user so that the real world point of view of the user corresponds to the orientation, wherein the mediated reality comprises rendering content in dependence upon a real world point of view of the user.

15. The method as claimed in claim 10, wherein one or more characteristics of the appearance of the user-selectable visual element is indicative of one or more characteristics of the audio content selectable via the user-selectable visual element.

16. A non-transitory computer readable medium comprising program instructions stored thereon for performing at least the following:
providing a user interface, for enabling a user to select audio content, comprising an arrangement of multiple user-selectable visual elements, at positions in the user interface that are indicative of different orientations from a user, that have an appearance dependent upon audio content for the respective orientations; and
responding to selection of a user-selectable visual element at a position in the user interface indicative of an orientation from the user to select, for processing, audio content for the orientation, wherein in an instance in which the audio content for the orientation is changed without changing the orientation from the user, the apparatus is caused to change an appearance of the user-selectable visual element at the position in the user interface indicative of the orientation, wherein the user-selectable visual elements of the arrangement comprise a first portion that is asymmetric and indicative of an orientation from a user and a second portion that has an appearance dependent upon audio content for the orientation, and wherein the first portion represents a segment of a circle having characteristics of appearance comprising one or more of segment size, width or length.

\* \* \* \* \*